C. J. COOPER.
Double-Winged Cultivator.
No. 197,100. Patented Nov. 13, 1877.
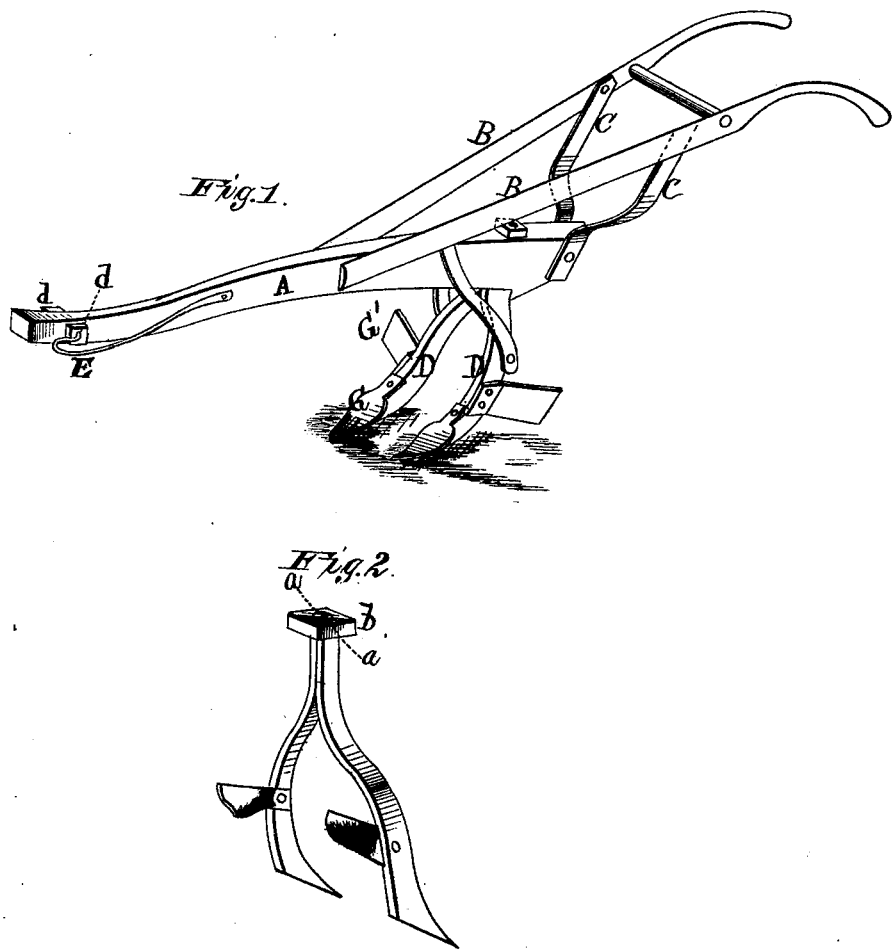

UNITED STATES PATENT OFFICE.

CHARLES J. COOPER, OF OXFORD, ALABAMA.

IMPROVEMENT IN DOUBLE-WINGED CULTIVATORS.

Specification forming part of Letters Patent No. 197,100, dated November 13, 1877; application filed August 13, 1877.

*To all whom it may concern:*

Be it known that I, CHARLES JEFFERSON COOPER, of Oxford, in the county of Calhoun and in the State of Alabama, have invented certain new and useful Improvements in a Double-Winged Cultivator; and do hereby declare that the following is a full, clear, and exact description thereof, reference being had to the accompanying drawings, and to the letters of reference marked thereon, making a part of this specification.

The nature of my invention consists in the construction and arrangement of a double-winged cultivator, as will be hereinafter more fully set forth.

In order to enable others skilled in the art to which my invention appertains to make and use the same, I will now proceed to describe its construction and operation, referring to the annexed drawing, in which—

Figure 1 is a perspective view of my cultivator. Fig. 2 shows a modification of the same.

A represents the plow-beam; B B, the handles, and C C the stays for the handles, all constructed in any of the known and usual ways.

D D represent the cultivator feet, bent as shown, and having their upper ends passed upward through a mortise in the beam A. The extreme upper ends of the feet form half-round tenons $a\ a$, which, when put together, constitute a short bolt with exterior screw-threads, and on the same is screwed a nut, $b$, thereby securing the feet firmly in the beam. The feet D D are made of bar-iron, and run edgewise, so as to throw but little dirt or trash to the plant.

On the end of each foot D is secured a shovel-plow, G, and a wing, G', is bolted to the outer side of the foot.

On the side of the beam is a clevis, E, the front end of which is passed laterally through the beam and adjusted by means of nuts $d\ d$. In Fig. 2 I have shown the wings G' attached to the inner sides of the feet D D and inclined inward. This device is used for covering seed, such as corn, cotton, &c., and in cultivating and dirting the plants the second time.

This double cultivator is intended to be used in the cultivation of all young and small crops, and will throw off the grass and weeds, and at the same time cultivate deep around the roots of the plants.

The cultivator can be used with a common clevis where the plants are to be thinned, but when thinned the side clevis E is used. This implement is simple, cheap, and light, and can be operated by any ordinary hand.

Having thus fully described my invention, what I claim as new, and desire to secure by Letters Patent, is—

The feet D, provided with plows G and wings G', and forming half-round threaded tenons $a\ a$, in combination with the mortised beam A and nut $b$, as set forth.

In testimony that I claim the foregoing I have hereunto set my hand this 23d day of July, 1877.

CHARLES JEFFERSON COOPER.

Witnesses:
 O. W. COOPER,
 T. A. HOWL.